United States Patent [19]

Beverly

[11] Patent Number: 4,860,579
[45] Date of Patent: Aug. 29, 1989

[54] TIRE LEAKAGE DETECTION METHOD FOR CENTRAL TIRE INFLATION SYSTEM

[75] Inventor: James A. Beverly, Kalamazoo, Mich.

[73] Assignee: Eaton Corporation, Cleveland, Ohio

[21] Appl. No.: 198,404

[22] Filed: May 25, 1988

[51] Int. Cl.⁴ ............................................... B60C 23/02
[52] U.S. Cl. ...................................... 73/146.2; 73/49; 152/416
[58] Field of Search ................. 73/49, 146.2; 152/416, 152/417

[56] References Cited

U.S. PATENT DOCUMENTS

| | | | |
|---|---|---|---|
| 3,276,503 | 10/1966 | Kilmarx | 152/417 |
| 4,487,154 | 12/1984 | Daly et al. | 73/146.2 |
| 4,574,267 | 3/1986 | Jones | 73/146.2 |
| 4,640,331 | 2/1987 | Braun et al. | 152/417 |
| 4,678,017 | 7/1987 | Schultz | 152/416 |
| 4,763,709 | 8/1988 | Scholer | 73/146.2 |

Primary Examiner—Stewart J. Levy
Assistant Examiner—Michele Simons
Attorney, Agent, or Firm—H. D. Gordon

[57] ABSTRACT

A method for sensing and reacting to conditions indicative of leakage in a tire (16 or 18), the pressurization of which is measured and controlled by a CTIS (10).

9 Claims, 3 Drawing Sheets

TIRE LEAKAGE DETECTION METHOD FOR CENTRAL TIRE INFLATION SYSTEM

RELATED APPLICATION

This application is related to Ser. No. 198,411, filed May 25, 1988 and titled "TIRE LEAK DETECTION METHOD FOR CENTRAL TIRE INFLATION SYSTEM".

BACKGROUND OF THE INVENTION

1. Field of the Invention

The present invention relates to a CTIS control method for detecting, after completion of a pressure measurement or pressure adjustment operation, a leaking tire (as may be caused by a malfunctioning wheel-end valve and/or a damaged tire) and, if such condition is sensed, to modified system operation to minimize the undesirable effects of such condition.

2. Description of the Prior Art

Central tire inflation systems, also known as tire traction systems, are well known in the Prior art as may be seen by reference to U.S. Pat. Nos. 2,634,782; 2,976,906; 2,989,999; 3,099,309; 3,102,573; 3,276,502; 3,276,503; 4,313,483; 4,418,737; 4,421,151; 4,434,833; 4,640,331 and 4,678,017, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desirable to decrease the tire pressure from the over-the-road or highway inflation pressure to increase riding comfort on rough roads. On the other hand, higher tire pressures decrease rolling resistance and tire carcass temperatures on smooth roads thereby increasing economy and safety. Accordingly, in cross country vehicles it is desirable to change the inflation pressure in the pneumatic tires to fit the terrain and is also desirable that a system be provided for changing the inflation pressure of the tires from an on-board source, while the vehicle is at motion or at rest and that the system be controlled from the vehicles operating cab.

In a particular type of CTIS, as illustrated and described in above-mentioned U.S. Pat. No. 4,640,331, a plurality of wheel ends (each comprising one or more tires) are each fluidly connected by a separate branch conduit to common central conduit which may be connected to a source of pressurized air for inflating the tires, to a source of regulated pressurized air for deflating the tires and/or, to atmosphere for venting the conduits and relieving pressure across the rotating seals. A common central conduit may be pressurized by means of a quick release valve or the like to the average pressure of the various branch conduits. A single pressure transducer is provided in fluid communication with the common central conduit, or the second conduit, remote from the wheel ends, for sensing a value indicative of the pressure or average passage in the inflatable tires.

Typically, periodically (about every fifteen minutes) the CTIS would automatically check tire pressures to determine if correction is necessary.

While the on-board CTIS described above is highly advantageous as pressure venting is remote from the wheel ends and a single pressure transducer, located in a relatively well protected location remote from the wheel ends and/or the vehicle under carriage, can be utilized to sense tire inflation of the vehicle tires or groups of tires, the CTIS was not totally satisfactory as if tire leakage occurred due to tire damage and/or wheel end valve malfunction at completion of a tire check or pressure adjustment, such leakage would not be detected until the periodic check by which time an unacceptable loss of tire pressure may have occurred.

SUMMARY OF THE INVENTION

In accordance with the present invention, the drawbacks of the prior art are minimized or eliminate by the provision of a CTIS control system having a method for detecting a leaking damaged tire and/or a malfunctioning wheel-end valve which fails to close at completion of a tire pressure measurement operation, and for taking corrective action, if necessary.

The above is accomplished by causing the system to take a single, confirming pressure measurement about thirty seconds after completion of a pressure measurement or adjustment operation. If a pressure decrease is sensed, a possible leakage condition is implied and corrected by means of inflation. Upon successfully reaching desired tire pressure, the period between automatic pressure sensing adjustments is considerably shortened. The system will maintain this mode indefinitely until such condition is corrected. By way of example, the period may be shortened to thirty seconds from fifteen to thirty minutes.

Upon detection of a leaking damaged tire condition, the CTIS controller, preferably microprocessor based, may signal the vehicle operator of the condition and continue the shortened cycle pressure sensing adjusting operation of the CTIS system to minimize pressure loss at the leaking wheel end.

Accordingly, it is an object of the present invention to provide a new and improved control method for an on-board central tire inflation system.

This and other objects and advantages of the present invention will become apparent from a reading of the following description of the preferred embodiments taken in connection with the attached drawings.

DESCRIPTION OF THE PREFERRED EMBODIMENT

Figure 1:
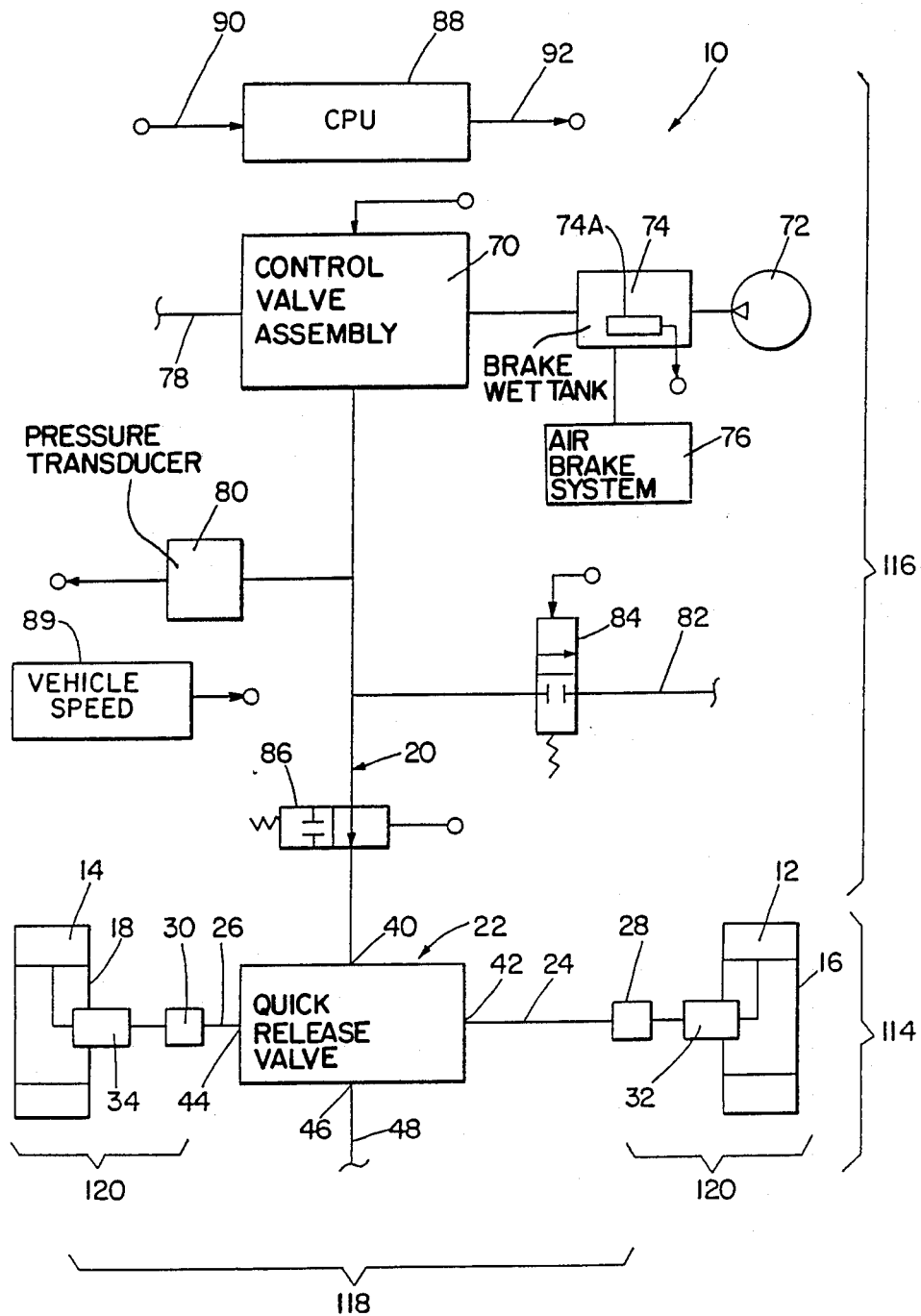
FIG. 1 is a schematic illustration of the pneumatic and electronic components of the present invention as utilized to control the inflation of groups of tires.

In the following description of the present invention, certain terms will be utilized for purposes of reference only and are not intended to be limiting. The terms "upward", "downward", "rightward" and "leftward" refer to direction in the drawings to which reference is made. The terms "inward", and "outward", respectively, refer to directions towards and away from, respectively, the geometric center of the device described. The terms "inflation" and "deflation", respectively, refer to increased and decreased, respectively, pressurization of a tire or the like. Said terminology will include the words above specifically mentioned, derivatives thereof and words of similar import.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to above-mentioned U.S. Pat. No. 4,640,331. Assuming, for example, the vehicle rear drive axle tires are normally inflated about about 75 psi (pounds per square inch) for highway operation, decreasing the tire inflation pressure to be 35 psi for cross country travel over rough road or to about 20–25 psi for operation in sand, mud or snow conditions or to about 10–12 psi for severe emergency conditions, will result in the tire having a greater contact area (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desirable that the tire inflation pressures be controllable from the vehicle cab from an on-board source of pressurized fluid and be variable and maintainable with the vehicle in motion as well as when the vehicle is at rest.

In an on-board CTIS system wherein the pressurization of certain tires, such as the tires on a particular axle or set of axles, is measured and controlled by periodically fluidly communicating the tire pressures with a common conduit during pressure measurement and control operations, it is desirable that the CTIS control have a method for detecting conditions indicative of one of the tires leaking or damaged beyond acceptable limits, to notify the vehicle operator of such condition and to modify the normal operating of the CTIS to prevent the tires from excessive loss of pressure. This is especially important in a CTIS wherein automatic pressure checkpressure adjustments, in the absence of a sensed leakage condition, occur only at relatively long intervals, such as once every fifteen minutes to once every thirty minutes. In such systems, it is important to verify, before the start of such extended period, that the wheel end valves are closed and that the tires are not damaged. This is especially true as, if a leakage condition exists, excessive pressure loss may occur during such extended period.

The CTIS control method of the present invention is especially well suited for the type of CTIS 10 schematically illustrated in FIG. 1 and disclosed in above-mentioned U.S. Pat. No. 4,640,331. CTIS 10 measures and controls the inflation pressure of the interior pressurized chambers 12 and 14 of a group of tires 16 and 18, respectively, by causing the chambers to fluidly communicate with a common conduit, the pressurization of which conduit may be selectively increased, decreased, vented to atmospheric and/or measured. Tires 16 and 18 are typically grouped for this purpose as carried by an axle or set of axles and being of the same ideal inflation pressurization for various operating conditions.

Each of the inflatable chambers 12 and 14 of tires 16 and 18 are fluidly connected to a common quick release valve 22 by means of a branch fluid passage, 24 and 26, respectively. The fluid passages each include a rotary seal assembly, 28 and 30, and a wheel-end valve assembly, 32 and 34. The rotary seal assemblies may be of any construction, such as seen in U.S. Pat. No. 4,434,833, the disclosure of which is incorporated by reference.

The wheel end valves 32 and 34 are normally closed to block fluid communication between the tire chambers and the quick release valve 22 and are effective to be selectively opened to fluidly communicate the tire chambers and valve 22. Wheel end valves 32 and 34 are preferably controlled by pressurization evacuation in the conduits 24 and 26 and are opened or closed as a group. Wheel end valves 32 and 34 may be of the structures illustrated in above-mentioned U.S. Pat. Nos. 4,640,331 and 4,678,017.

Figure 2:
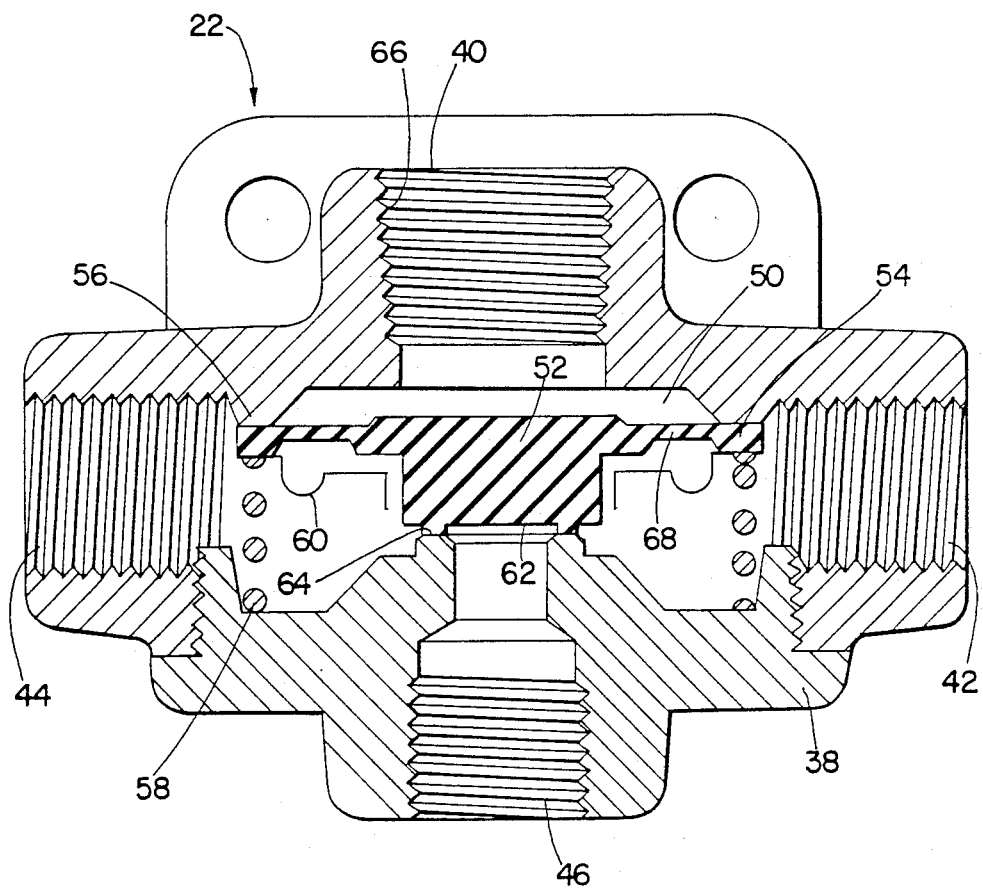
FIG. 2 is a section view of the quick release valve schematically illustrated in FIG. 1.

The structure and operational function of valve 22 may be seen in greater detail by reference to FIG. 2. Valve 22 includes a valve body 38 defining a first port 40 connected to common conduit 20, a second port 42 connected to passage 24, a third port 44 connected to passage 26 and a fourth port 46 connected to a vent passage 48 to atmosphere. The valve body 38 defines a central cavity 50 in which a valve member such as plug-type diaphragm 52 is received.

The outer periphery 54 of diaphragm 52 cooperates with an annular valve seat 56 to control the flow of fluid between port 40 and the fluidly communicating ports 42 and 44. A spring 58 and spring retainer 60 may be utilized to bias the outer periphery 54 into sealing contact with the valve seat 56. The central plug portion 62 cooperates with an annular valve seat 64 at port 46 to control the flow of fluid between ports 46 and the fluidly communicating ports 42 and 44. Diaphragm plug 62 is biased into sealing engagement with valve seat 64 by means of fluid pressure in conduit 20 acting on upper surface 66. The average pressure in passages 24 and 26 act upon the undersurface 68 of the diaphragm.

The operational characteristics of quick-release valve 22 are that a fluid flow (i.e. flow of higher pressurized fluid to a conduit or chamber at a lower pressurization) may be maintained from port 40 to ports 42 and 44. However, a fluid flow may not be maintained from ports 42 and 44 to port 40 as diaphragm 52 will lift to open ports 42 and 44 to the exhaust port 46. Further, the valve 22, by establishing fluid communication from port 40 to ports 42 and 44, and from the pressure of conduits 20, 24 and 26, ports 42 and 44 (conduits 24 and 26) to exhaust port 46, is effective to equalize at the pressurization of the lower pressurized of conduit 20 or average pressure of conduits 24 and 26.

It is important to note that quick-release valve 22 through which the various valves at the wheel end assemblies are vented, is located remote from the wheel end assembly and may also be located remotely from the control valve and pressure transducer to be described below.

If a pressure differential exists between tires 16 and 18, when the wheel end valves are opened and the conduit 20 is sealed, the pressure in conduit 20 will initially be the higher of the tire pressures and will decrease to an average of the tire pressures as the tires cross breath.

A control valve assembly 70 is connected to a source of pressurized fluid, such as on-board compressor 72. Typically, compressor 72 will communicate with a vehicle air brake wet tank 74 which will supply the air brake system 76 with a higher priority than the CTIS control valve assembly 70. The control valve assembly is also connected to a vent passage 78 to atmosphere and to the central conduit 20.

The control valve assembly is effective to selectively vent conduit 20 to atmosphere to vent passages 24 and 26, to pressurize conduit 20 to a relatively high pressure for inflation of the tires, to pressurize conduit 20 to a relatively low pressure to deflate the tires or to pulse conduit 20 with a high pressure to allow conduit 20 to stabilize at the average pressure in the tire chambers. Preferably, if wheel end valves similar to those disclosed in above-mentioned U.S. Pat. Nos. 4,640,331 or 4,678,017 are utilized, pressurization and venting of conduit 20 is also effective to open and close, respectively, the wheel end valves.

A pressure transducer 80 is provided for sensing the pressurization of conduit 20 and for providing an output signal indicative thereof. To obtain an accurate measurement of average tire pressure, wheel end valves 32 and 34 must be opened and conduit 20 must be sealed at control valve assembly 70 to allow the pressure in conduit 20 to attempt to stabilize at average tire pressure.

A second central conduit 82 and a pair of two-way two-position valves 84 and 86 may be provided to allow the control valves assembly 70 and transducer 80 to be utilized to measure and control a different set of tires.

A central processing unit (CPU) 88, preferably microprocessor based, may be provided for controlling system 10. CPU 88 includes conditioning circuits 90 for receiving input signals, such as signals from pressure transducer 80, conditioning circuits 92 for issuing command output signals and logic (hardware or software) for defining logic rules by which the input signals are processed to generate command output signals.

At system start-up, or periodically during vehicle operation, it is desirable to have a system diagnostic routine or method to test for leakages which may require discounting the normal system operation and adopting a modified mode of operation until the condition is repaired.

In operation, CPU 88 is effective to cause an automatic periodic pressure check to determine if corrective action is required. Typically, in the absence of a sensed system fault or leakage condition, such pressure check operation will be commanded at a relatively long interval, such as every fifteen or thirty minutes, from the last pressure check/pressure check operation. If a tire leakage condition exists after obtaining a desired pressure and going to the steady state condition and is undetected, excessive tire deflation may occur during the steady state period between pressure checks.

Accordingly, during a pressure check/pressure modification operation, after desired pressure of the tires is verified and prior to entering into an extended steady-state operation, a verification checking routine is followed. The system is shut down (assumes period of steady-state or idle-state conditions) for a relatively short period of time, for example about thirty seconds. The system then performs a pressure measurement operation and compares the sensed inflation pressures just prior to and in the verification check. If pressure remains the same, or within prescribed limits, the lack of a leakage condition is verified, the CTIS assumes its steady-state condition and the CTIS will not automatically perform the next pressure check until expiration of the extended period of time. If a leakage condition is sensed, the operator will be informed of the condition and automatic pressure checking/pressure adjustment operations will occur at relatively short periods for example, to minimize the loss of pressure caused by the leakage condition.

Figure 3:
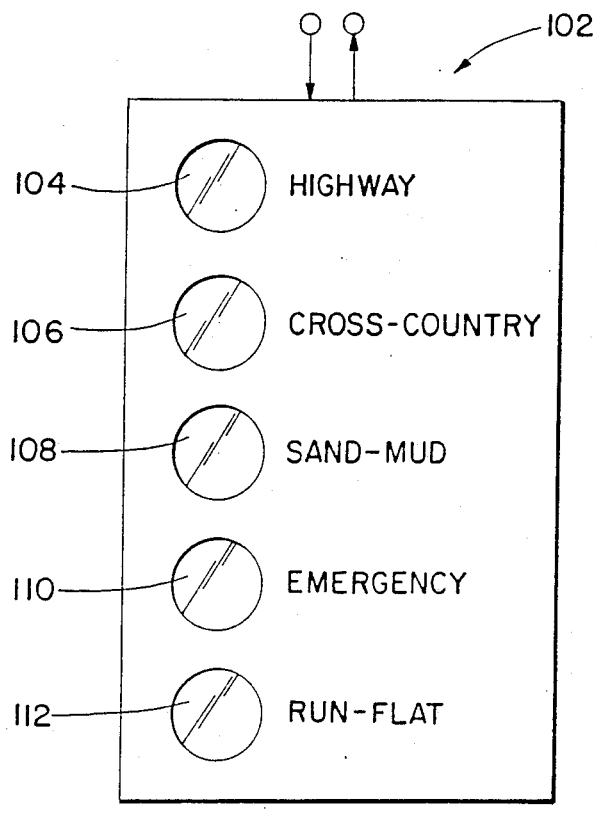
FIG. 3 is a schematic illustration of an operator's control panel.

In one embodiment, the vehicle operator is provided with a control panel 102, see FIG. 3, having five illuminatable buttons, 104, 106, 108, 110 and 112, by which a desired tire pressurization may be selected. If the tire leak check indicates a leakage condition such as described above, the desired mode indication will flash indicating an inflate operation. If a leakage rate greater than can be compensated for by CTIS 10 is detected, all five buttons will flash and the system will remain shut down.

As may be seen by reference to FIG. 1, CTIS 10 includes an at-axle portion or portions 114 and a remote portion 116 which may be located anywhere on the vehicle, preferably at a relatively protected location. Further, the at-axle portions 114 of system 10 comprise a stationary portion 118 and rotating portions 120.

Although the preferred embodiments of the present invention have been described with a certain degree of particularity, it is understood, of course, that certain substitutions for and rearrangement of the parts may be resorted to without departing of the spirit and the scope of the present invention as hereinafter claimed.

I claim:

1. A diagnostic method for sensing and reacting to conditions indicative of leakage of an inflatable tire, the pressurization of which tire is measured and controlled by an on-board CTIS, said CTIS automatically measuring inflation pressurization of said tire at predetermined extended time intervals and, in the absence a sensed system fault condition or pressure modification commands, assuming a steady-state condition during each of said extended time intervals between automatic pressure measurements, said method characterized by:

at the completion of each automatic pressure measurement operation and pressure adjustment operation, after desired tire pressurization is sensed, assuming steady state conditions for a predetermined period of time, then performing a confirming pressure measurement to sense change in tire pressurization during said predetermined period of time, said predetermined period of time substantially shorter than said extended time interval, and;

if the sensed change in tire pressurization is less than a reference value, allowing said CTIS to assume steady state conditions until expiration of said extended time interval; and if the sensed change in tire pressurization is equal to or greater than said reference value, causing said CTIS to pressurize the tire to desired pressurization and to perform continuing automatic tire pressurization measurements after shortened time intervals of steady-state condition.

2. The method of claim 1 wherein said extended time intervals are at least ten times longer than said shortened time intervals.

3. The method of claim 1 wherein said extended time intervals are at least twenty times greater than said shortened time intervals.

4. The method of claim 1 wherein said extended time interval is at least ten minutes and said shortened time interval is less than thirty seconds.

5. The method of claim 1 further characterized by signaling the pressure of a tire leakage condition if said sensed change in tire pressurization is equal to or greater than said reference value.

6. The method of claim 1 wherein said reference value is generally equal to the expected change in pressure of said inflatable tire during said predetermined period time under failure of wheel-end valve to close conditions.

7. The method of claim 1 wherein said predetermined period of time is generally equal to said shortened time interval.

8. The method of claim 1 wherein said extended time intervals are at least ten times greater than said predetermined period of time.

9. The method of claim 1 wherein said extended time interval is at least ten minutes and said predetermined period of time is less than thirty seconds.

* * * * *